P. H. THOMAS.
SYSTEM OF ELECTRICAL DISTRIBUTION.
APPLICATION FILED JULY 12, 1916.

1,237,584.

Patented Aug. 21, 1917.

2 SHEETS—SHEET 1.

WITNESSES
Chas. G. Clagett

INVENTOR
Percy H. Thomas
BY
Attorney

P. H. THOMAS.
SYSTEM OF ELECTRICAL DISTRIBUTION.
APPLICATION FILED JULY 12, 1916.

1,237,584.

Patented Aug. 21, 1917.
2 SHEETS—SHEET 2.

WITNESSES
Chas F. Clagett

INVENTOR
Percy H. Thomas
BY
[signature]
ATTORNEY

UNITED STATES PATENT OFFICE.

PERCY H. THOMAS, OF UPPER MONTCLAIR, NEW JERSEY, ASSIGNOR TO COOPER HEWITT ELECTRIC COMPANY, OF HOBOKEN, NEW JERSEY, A CORPORATION OF NEW JERSEY.

SYSTEM OF ELECTRICAL DISTRIBUTION.

1,237,584.  Specification of Letters Patent.  Patented Aug. 21, 1917.

Original application filed February 3, 1913, Serial No. 745,786. Divided and this application filed July 12, 1916. Serial No. 108,791.

*To all whom it may concern:*

Be it known that I, PERCY H. THOMAS, a citizen of the United States, and resident of Upper Montclair, county of Essex, State of New Jersey, have invented certain new and useful Improvements in Systems of Electrical Distribution, of which the following is a specification.

My invention relates to circuits for operating mercury vapor rectifiers from multiphase alternating supply circuits and also certain particular features of the systems shown herein.

Figure 1:
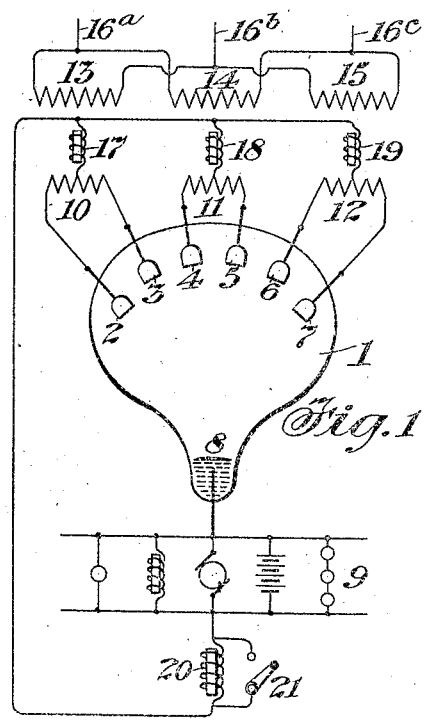
Figure 2:
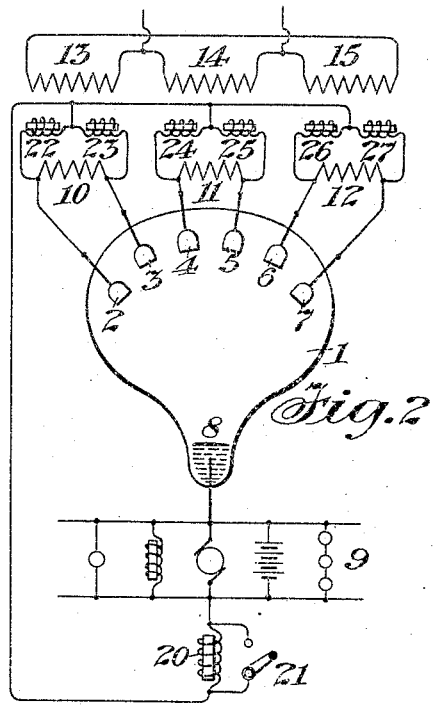
Figure 3:
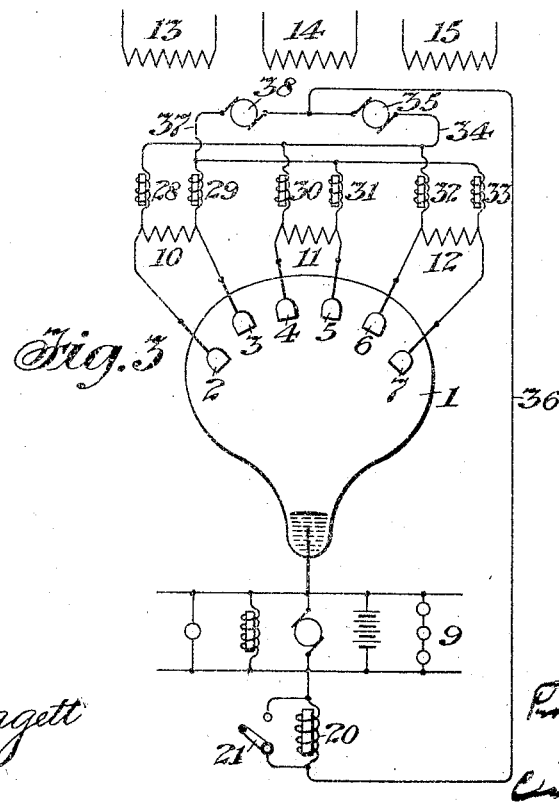
Figure 4:
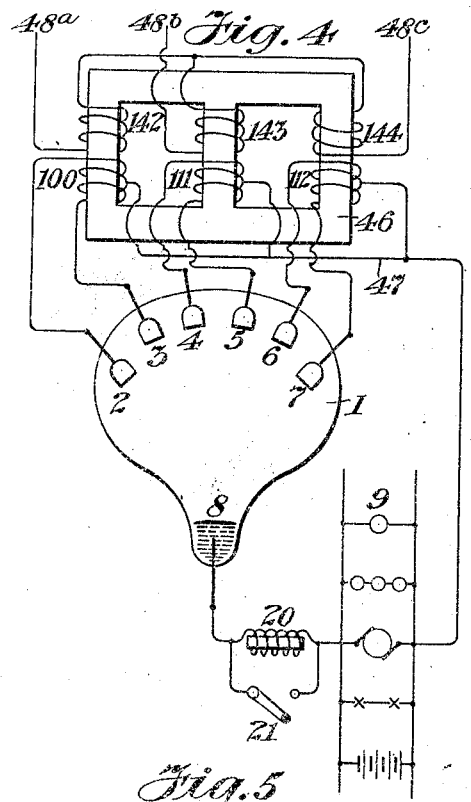

The economy in the transmission of energy of multi-phase systems offers advantages at least partly predicated upon the symmetrical flow of current therein. It is well known that when one phase only of a multi-phase supply is used, that this ordinarily does not produce such a symmetrical flow of current and, to a greater or less extent, sacrifices certain of the advantages expected in general of the multi-phase supply. The use of a mercury vapor rectifier, of the type characterized by an exhausted container and a vaporizable reconstructing cathode therein, when utilizing only one or two main anodes, tends to introduce an unsymmetrical loading on a multi-phase supply system, such, for example, as a three phase supply, and to this extent interference with the best results obtainable in general from a symmetrically loaded three phase source. It is one of the purposes of the present invention to point out systems, circuits and forms of rectifiers adapted to better this condition of inefficiency. In the present drawings, in which Figure 1 shows a system supplying a vapor rectifier through three phase transformers with three D. C. inductances; Fig. 2 shows a similar system having six inductances; Fig. 3 a modification of Fig. 2; Fig. 4 a three phase transformer supplying a circuit something like that of Fig. 3, and Fig. 5 a six phase supply with a balance device, I have shown three phase supply circuits as typical of polyphase circuits, but I wish it understood that my invention is broad enough to cover other poly-phase systems.

Considering more particularly the first figure, 1 is a vapor rectifier having anodes 2, 3, 4, 5, 6, 7 and a cathode 8. 9 is a work circuit containing various translating devices and 10, 11 and 12 are three transformer secondary windings whose primaries are shown respectively at 13, 14 and 15. The three primary windings are connected in delta across the three phase mains $16^a$, $16^b$ and $16^c$. The middle points of the secondaries 10, 11 and 12 respectively are connected through three inductance coils 17, 18 and 19 with the negative side of the work circuit 9. In this latter connection I may introduce an inductance, 20, and provide a switch 21 by which the coil may be short circuited when desired. The rectifier, 1, may be started in any of the well known ways adapted to such apparatus and the device instead of being as shown may be made in a great variety of forms as, for example, in the form shown in my copending application Serial Number 745,787, filed February 3rd, 1913, now Patent No. 1,110,603, of date Sept. 15, 1914.

The operation of this system may be described as follows: The transformer secondary, 10, with the inductance, 17, together with the electrodes, 2, 3 and 8 constitute, in effect, a single phase rectifier supplied from the primary, 13, which in turn is fed from the mains $16^a$ and $16^b$. This single phase rectifier is capable of supporting current continuously regardless of any of the other transformer windings or electrodes and will call for substantially normal single phase currents from the mains $16^a$ and $16^b$. In this case the inductance, 17, is made to have the well known keeping alive function. It may or may not be assisted by the inductance 20.

Similarly, the transformer secondary, 11, the anodes, 4 and 5, and the cathode, 8, together with the inductance coil, 18, constitute a second single phase rectifier fed from the primary winding, 14, which in turn is supplied from the mains $16^a$ and $16^c$. This second elemental rectifier is by itself capable of sustaining continuous current flow and serves to produce a substantially regular single phase current in the mains $16^a$ and $16^c$. Similarly with the elemental rectifier constituted by the secondary winding 12, the inductance 19, the electrodes 6, 7 and 8. This third elemental rectifier similarly causes single phase currents in the mains $16^a$ and $16^c$. Thus the net result is to produce a symmetrical relatively normal flow of curent in the three phase mains, giving the ordinary advantages of three phase generation and transmission. Were, however, the inductances 17, 18 and 19 omitted and reliance placed upon some such inductance as the coils 20, current would flow from but one anode at a time,—that anode having for the moment the highest potential,—so that current would flow in but one of the three transformers at any one time with the result that relatively unbalanced and intermittent current would flow in the three phase supply mains 16$^a$, 16$^b$, 16$^c$, and cause a resultant loss in efficiency and effectiveness as will be evident. Thus, by the insertion of the inductances 17, 18 and 19 and the delta connection of the transformer primaries 13, 14 and 15 and by the use of this system as a whole as shown, a symmetrical continuous flow of current is secured in the three phase mains and further current flows simultaneously from three of the anodes at all times so that the use of the anodes and the secondaries 10, 11 and 12 is much less intermittent and therefore much more advantageous than under the condition in which the inductances 17, 18 and 19 are not used. These advantages may be of great importance in some developments as, for example, where a railroad is operated by means of vapor rectifiers so that the predominant part of the load on the power house is of this character.

In Fig. 2 I show a system having similar characteristics but instead of obtaining the neutral points of the transformer secondaries 10, 11 and 12 directly I accomplish the same result by connecting two inductances in series across the transformer secondaries and using the common points of the pairs of inductances, which are numbered 22, 23, 24, 25, 26 and 27 respectively. In general the system of Fig. 2 is similar to the system of Fig. 1 and its operation will be understood without further explanation.

In Fig. 3 I show a system somewhat similar to Fig. 2, but the inductances 28, 29, 30, 31, 32 and 33 for obtaining the middle point of the system are differently grouped, that is the inductances 28, 30 and 32 connected to the left hand terminals of the transformer secondaries 10, 11 and 12 are connected to a common load 34, which may be a motor, by their lead 35 and to the return conductor 36, while the three inductances, 29, 31 and 33 are connected through the common conductor 37, and the motor or other translating device, 38, to the return conductor, 36, leading through the inductance 20 to the main cathode, 8, to the work circuit, 9. In this system I utilize two translating devices, 35 and 38, such as two motors, mechanically linked together, each operating upon one train of waves. In this system I obtain the advantage of the normal supply of single phase currents in the primary windings which may, if desired, be connected in delta as shown in Figs. 1 and 2, or in star.

In Fig. 4 I have shown in place of three single phase transformers a three phase transformer with three secondaries, 110, 111 and 112, and three primaries, 142, 143 and 144. The core is shown at 46. The middle points of the secondary windings 110, 111 and 112 are connected to a common conductor, 47, which leads through the work circuit, 9, the inductance coil, 20, to the anode 8. The terminals of the transformer secondaries 110, 111 and 112 are connected to the anodes 2, 3, 4, 5, 6 and 7; the primaries 142, 143 and 144 are star connected, the mains being shown at 48$^a$, 48$^b$, 48$^c$.

In operation the same advantages of relative continuity are obtained and in addition the linking together of the sets of windings on a single core inter-relates these windings in such a way as to increase the relative continuity of the currents in the supply.

Figure 5:
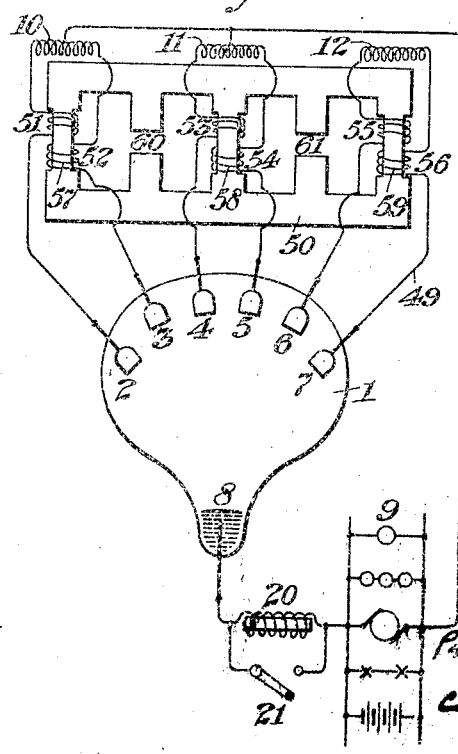

In Fig. 5 I show three single phase transformer secondaries 10, 11 and 12 connected to the anodes 2, 3, 4, 5, 6 and 7 of the vapor rectifier and also at their middle points by the conductor, 36, through the work circuit, 9, and the coil, 20, and the cathode, 8. In the leads between the transformer secondaries and the rectifier I insert a balancing device, 50, consisting of the core, 50, and six windings 51, 52, 53, 54, 55 and 56. These coils are located one in each of the six leads from the transformer secondaries 10, 11 and 12. The two coils shown at 52, located in the leads of the transformer secondary, 10, are located on one leg, 57, to the core, 50. The coils 52 and 54 in the leads of the transformer secondary, 11 are located on the leg, 58, of the coil, 50, while the coils 55 and 56 in the leads of the transformer secondary, 12, are located in the leg 59. I sometimes add supplemental magnetic leakage gaps 60 and 61 between the main legs of the core to increase the inductance of the several pairs of coils. The operation of this figure may be described as follows. Without the balance device, 50, six current impulses in the cycle would flow in appropriate order from the six anodes to the cathode, each half of a transformer secondary supplying one impulse. This calls for a relatively infrequent or discontinuous use of the primary windings and anodes as well as primary windings which have already been described as disadvantageous.

Then, in the use of the balance device, 50, however, we have a current impulse flowing from the transformer secondary, 10, to the coil, 51, a counter acting electromotive force is set up by the electrical core, 57, which tends to cause a similar electromotive force in the coils located on the legs 58 and 59 but in the opposite direction. However, since the pairs of coils 51 and 52; 53 and 54; and 55 and 56 are so wound that an electromotive force produced in the core of any pair tends to produce simultaneous electromotive forces to or from the container in both coils of the pair as the direction may happen to be, and since what would be a counter electromotive force in the leg 57 will be a favorable electromotive force in the legs 58 and 59, the result of the current impulse, 51, will be to produce electromotive forces in the coils 53 and 54 toward the anodes 4 and 5. One of these favorable impulses combined with the favorably directed electromotive force in the secondary 11 will cause current to flow in the corresponding anode 4 or 5. Similarly with the coils 55 and 56 on the leg 59. If the balance device, 50, is so proportioned that the magnetizing power of the impulse, 51, bears somewhat the same relation to the reluctance of the core, 50, as the work current in the primary of the transformer bears to the reluctance of the core of the latter, the impulse in the coil 51 will produce a sufficiently powerful electromotive force in the coils 53, 54, and 55, 56 to initiate current flow in one or the other of the coils of each pair. As the highest electromotive force naturally passes from the circuit of the coil, 51, to the next circuit, for example, the circuit of the coil 54 the same sort of thing is repeated so that current flow in the core 54 causes current flow in two other coils. This arrangement thus gives a relatively very steady and continuous use of the anodes and transformer windings and causes relatively normal flow of current in the primary windings.

To proportion the flow of current in the several windings more or less in proportion to the momentary voltages therein I may, if desired, make the legs 57, 58 and 59 relatively small cross section as shown in the drawing. This has the effect of producing partial saturation and tending to reduce the assisting electromotive force in the other legs. I may also supply leakage paths, 60 and 61, between the legs which would serve somewhat the same purpose for part of the magnetism produced by the coil acting as the exciting coil will be shunted away from the other active legs.

The description of my invention has been made more particular with respect to the various figures of the drawings, but I wish it understood I do not limit myself to these particular features, but consider other forms and arrangements producing the same results as falling within its scope. For example, other dispositions of the coil windings or equivalent devices may be substituted for those shown without changing the operation of the systems.

I further wish it understood that each of the several features shown in connection with any particular one of the systems may be and is intended to be applicable to the other systems when desired unless some obvious disability exists.

This application is a division of my application Serial Number 745,786, filed February 3rd, 1913, now Patent No. 1,211,380, of date Jan. 2, 1917.

I claim as my invention:

1. In a system of electrical distribution, the combination with a three-phase supply, three-phase transformer primaries connected thereto, six-phase transformer secondaries for said primaries, and a vapor electric rectifier having six main anodes connected to said six-phase secondaries, of a direct current inductance connected with each anode lead by one terminal and the work circuit by the other, whereby currents flow simultaneously in said rectifier from a plurality of said anodes.

2. In a system of electrical distribution, the combination of a multi-phase rectifier having a plurality of main anodes and a main cathode connected with suitable supply points of different phase and a balance device comprising coils connected in said anode leads and wound on a common core whereby current is caused to flow simultaneously in more than one main anode.

3. A balance device for a vapor electric rectifier comprising an exhausted container and a plurality of anodes and a cathode, said balance device comprising a core having a plurality of legs or branches, two coils on each leg wound in the same direction, each coil being connected by one end, with an anode, of a plurality of single-phase windings, the terminals of said windings being connected severally to the free ends of said pairs of coils.

4. The combination with a vapor rectifier including an exhausted container, six main anodes and a cathode, and a suitable three phase supply circuit, of a three phase transformer having secondary windings connected at their terminals with the several main anodes and jointly at their middle points to said cathode and primary windings connected in star.

5. In a system of electrical distribution, the combination with a three-phase supply circuit, three transformer primary windings connected in star across said supply, three secondaries for said primaries and a vapor electric rectifier comprising an exhausted container, a plurality of main anodes and a main cathode therein, of connections from the middle points of said secondaries to said cathode and from the terminals of said secondaries to said anodes whereby current in any primary winding can produce a favorably directed current flow in said rectifier and currents can flow from one supply main to another supply main through two of said primary windings, in the positive direction in one and in the negative direction in the other.

Signed at New York in the county of New York and State of New York this 10th day of July, A. D. 1916.

PERCY H. THOMAS.

Witnesses:
C. WESLEY POMEROY,
HAROLD B. WOODWARD.